March 6, 1928.

E. H. COOLEY 1,661,361

COMBINATION GRAVE MARKER AND FLOWER HOLDER

Filed Oct. 18, 1926

Inventor

E. H. Cooley.

By Lacey & Lacey, Attorneys

Patented Mar. 6, 1928.

1,661,361

UNITED STATES PATENT OFFICE.

EDWARD H. COOLEY, OF POINT MARION, PENNSYLVANIA.

COMBINATION GRAVE MARKER AND FLOWER HOLDER.

Application filed October 18, 1926. Serial No. 142,389.

This invention relates to a combination grave marker and flower holder and one object of the invention is to provide a device which may be marked with the name of the person buried in a grave and will also serve to hold flowers and protect the flowers from exposure to strong winds or excessive cold. At the present time, flowers are often placed in jars or other receptacles embedded in a grave or placed in metal cups having spikes which are forced into the ground but these methods are, to a great extent, unsatisfactory, as the flowers are not protected and are often quickly frozen during cold weather or damaged if a strong wind is blowing.

Another object of the invention is to provide the marker and flower holder with a protecting hood formed of transparent material so that the name inscribed upon the base of the device and covered by the hood, may be read, and to further so mount the hood that it will, of its own weight, remain in its normal position but may be readily lifted out of place when it is desired to substitute fresh flowers for dead or faded ones in the holder.

Another object of the invention is to so construct the base that air passages will be provided between the base and lower edge of the hood, through which air may circulate in order to keep the flowers fresh as long as possible.

The invention is illustrated in the accompanying drawings, wherein.

Figure 1:
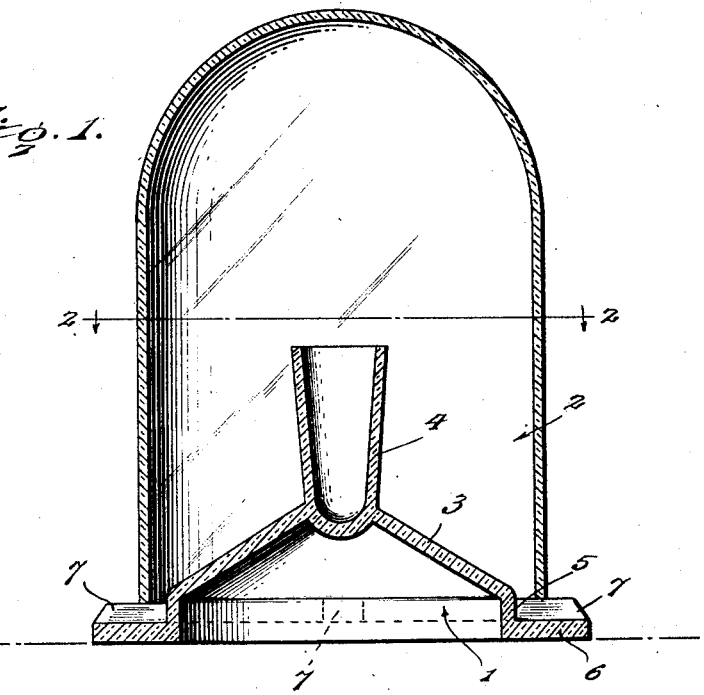
Figure 1 is a vertical sectional view through the improved grave marker and flower holder.

The improved grave marker and flower holder constituting the subject matter of this invention includes a base which is indicated in general by the numeral 1, and a hood 2. The hood and base are preferably both formed of glass, but it will be understood that other materials may be substituted, if so desired. It is essential, however, that the hood be transparent.

The base 1 includes an elevated central portion 3 which is of frusto conical formation and at its upper end carries a cup 4 which projects upwardly therefrom and is preferably increased in diameter toward its upper end. This cup is intended to receive flowers which may be either loose or in the form of a bouquet, but, if desired, the cup may be of the proper size and shape to receive a potted plant. A depending wall 5 is formed about the margin of the elevated central portion 3 and constitutes a continuation thereof and from the bottom of the wall 5 projects a marginal flange or rim 6 of sufficient width to permit the base to rest firmly upon the ground. The base, therefore, consists of the elevated central portion 3, depending wall 5 and horizontal flange 6. Ribs or blocks 7, which will be hereinafter referred to as spacers, project upwardly from the flange 6 in spaced relation to each other circumferentially thereof and extend from the wall 5 to the outer marginal edge of the flange. The spacers form supports upon which the hood 2 rests and since the hood is open at its lower end and held elevated by the spacers, it will be seen that air passages will be provided between the flange and the lower edge of the hood for the major portion of its circumference.

Figure 2:
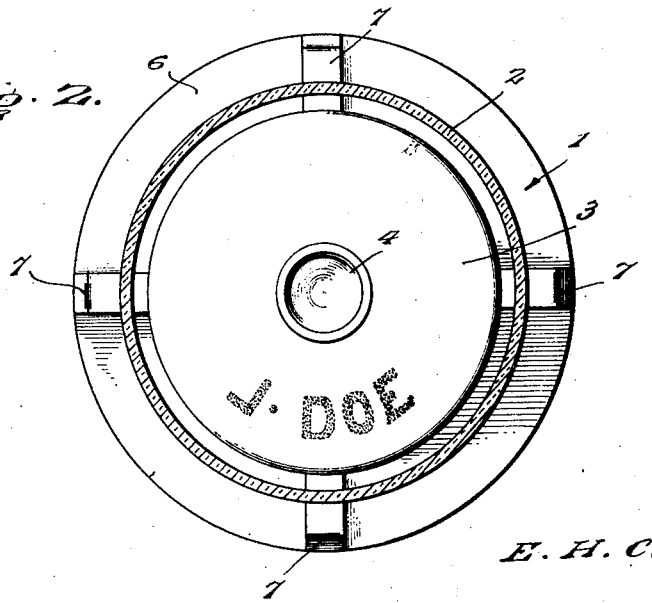
Figure 2 is a transverse sectional view taken on the line 2—2 of Figure 1.

When the marker is in use, the name of the person buried in the grave is inscribed upon the frusto conical central portion 3 of the base in any desired manner, as shown in Figure 2, and since the hood is transparent the name may be read when the hood is in place. The base is set upon the grave at one end or intermediate the length thereof and, if so desired, the flange 6 of the base may be partially or entirely embedded in the ground so that there will be no danger of the base tilting. After the base has been set in place, water is poured into the cup and flowers put therein. If a potted plant is placed in the cup, it will, of course, not be necessary to fill the cup with water before the plant is fitted into it. The hood is now set in place and since it surrounds the elevated portion 3 of the base and is closed at its upper end, the flowers will be entirely enclosed and protected from damage by strong winds, heavy rains, or cold. The lower edge of the hood is disposed in spaced relation to the flange 6 between the spacers 7 and, therefore, air may circulate through the hood and supply the necessary oxygen to prevent the flowers from quickly wilting. When the flowers need to be renewed it is merely necessary to lift the hood from the base and the faded or dead flowers may be replaced with fresh ones. The name of the person may also be inscribed upon the hood so that it may be easily seen by a person standing a short distance away from the grave.

Having thus described the invention, what I claim is:

1. A device of the character described comprising a base having an elevated central portion and a horizontally disposed marginal flange surrounding the elevated portion at the bottom thereof, an article holder carried by the elevated portion of said base and projecting upwardly therefrom, spacers extending across the upper surface of said flange, and a transparent hood open at its bottom and resting upon said spacers with the portions of its lower edge between the spacers spaced above the flange to provide air passages between the flange and hood.

2. A device of the character described comprising a base having an elevated portion and a marginal flange surrounding the elevated portion, spacers projecting upwardly from the marginal flange of said base, a flower holding cup carried by the elevated portion of said base, and a transparent hood enclosing the elevated portion of said base, said hood being open at its bottom and resting upon said spacers with the portions of its lower edge between the spacers held above the flange to provide air passages between the hood and flange.

3. A device of the character described comprising a base having a central portion and a horizontally disposed marginal flange surrounding said central portion, spacers projecting upwardly from the marginal flange of said base, a flower holding cup carried by the central portion of said base, and a transparent hood enclosing the central portion of said base, said hood being open at its bottom and resting upon said spacers with the portions of its lower edge between the spacers held above the flange to provide air passages between the hood and base.

In testimony whereof I affix my signature.

EDWARD H. COOLEY. [L. S.]